United States Patent [19]

Tabata et al.

[11] 4,100,421
[45] Jul. 11, 1978

[54] OZONE-GENERATING APPARATUS

[75] Inventors: Norikazu Tabata; Takanori Ueno; Keisuke Namba, all of Amagasaki, Japan

[73] Assignee: Mitsubishi Denki Kabushiki Kaisha, Amagasaki, Japan

[21] Appl. No.: 751,482

[22] Filed: Dec. 16, 1976

[30] Foreign Application Priority Data

Dec. 19, 1975 [JP] Japan .............................. 50/152521
Jan. 16, 1976 [JP] Japan .................................. 51/3828
Jan. 19, 1976 [JP] Japan .................................. 51/4735

[51] Int. Cl.² ........................................... C01B 13/00
[52] U.S. Cl. ...................................... 250/533; 55/31; 204/176
[58] Field of Search ............... 250/532, 533; 204/176; 55/31

[56] References Cited

U.S. PATENT DOCUMENTS

| 1,536,179 | 5/1925 | Hartman | 204/176 |
| 3,150,942 | 9/1964 | Vasan | 55/31 |
| 3,242,651 | 3/1966 | Arnoldi | 55/31 |
| 3,674,429 | 7/1972 | Collins | 55/31 |
| 3,719,573 | 3/1973 | Kawahata | 204/176 |

Primary Examiner—Benjamin R. Padgett
Assistant Examiner—Deborah L. Kyle
Attorney, Agent, or Firm—Oblon, Fisher, Spivak, McClelland & Maier

[57] ABSTRACT

An ozone-generating apparatus comprises an ozonizer; one or more moisture exchangers in which synthetic zeolite having fine pore diameter for inhibiting adsorption of ozone but easily adsorbing moisture, is filled as a moisture adsorbent; and switching means which switches the moisture exchangers at the inlets and the outlets thereof to alternatively repeat a moisture-adsorbing operation for drying air by passing a wet air through one of the moisture exchanger before feeding it to the ozonizer and a moisture adsorbent-recovering operation for drying the synthetic zeolite by passing the dry ozone-containing air generated from the ozonizer through the other moisture exchanger.

6 Claims, 7 Drawing Figures

OZONE-GENERATING APPARATUS

BACKGROUND OF THE INVENTION

1. Field of the Invention

The present invention relates to an ozone-generating apparatus which is used for disinfection, bleaching and oxidization. More particularly, it relates to an ozone-generating apparatus which comprises a moisture exchanger containing a moisture adsorbent which alternatively performs to dry air fed to an ozonizer and to recover the moisture adsorbent by a dry ozone-containing air.

2. Description of the Prior Art

FIG. 1 is a block diagram which shows the structure of the conventional ozone generator.

In FIG. 1, the reference 1 designates a compressing blower for feeding air under suitable pressure (hereinafter referring to as blower); 2 and 3 respectively designate moisture adsorbent towers (hereinafter referred to as adsorbent towers) in which a moisture adsorbent such as silica gel is filled; 4 designates an ozonizer which generates ozone by silent discharge in dry air dried by the adsorbent tower 2 or 3; 5 to 12 respectively designate electromagnetic valves and 13 designates a flow resistance for reducing the pressure of dry ozone-containing air generated by the ozonizer 4 to a predetermined value. The moisture exchanger 100 is formed by the combination of 1 to 3 and 5 to 13.

Referring to FIG. 1, the operation of the conventional ozone-generating apparatus will be illustrated.

Firstly, the air-drying operation of the adsorbent tower 2 for drying a wet air fed by the blower 1 and the moisture adsorbent-recovering operation of the adsorption tower 3 for drying the moisture adsorbent by the dry ozone-containing air generated by the ozonizer 4, will be illustrated.

Under the open state of the electromagnetic valves 5, 8, 9 and 12 and the close state of the electromagnetic valves 6, 7, 10 and 11, the wet air compressed by the blower 1 is fed through the electromagnetic valve 5 to the adsorbent tower 2 wherein it is converted to a dry air dried by the silica gel filled in the tower. The dry air is fed through the electromagnetic valve 9 to the ozonizer 4 wherein a part of oxygen in the dry air is converted to ozone by the silent discharge. The resulting dry ozone-containing air is passed through the flow resistance 13 to reduce the pressure to the predetermined pressure and is fed through the electromagnetic valve 12 into the adsorbent tower 3.

The dry ozone-containing air is fed into the adsorbent tower 3 to recover the moisture adsorbent whereby it is converted to a wet ozone-containing air. The wet ozone-containing air is fed through the electromagnetic valve 8 to the ozone-using part.

When the moisture adsorbing ability of the adsorbent tower 2 is decreased, the electromagnetic valves 5, 8, 9 and 12 are closed whereas the electromagnetic valves 6, 7, 10 and 11 are opened whereby the adsorbent tower 2 is switched from the air-drying operation to the adsorbent-recovering operation, and the adsorbent tower 3 is switched from the adsorbent-recovering operation to the air-drying operation. The adsorbent towers 2, 3 alternatively repeat the operations to attain the function as the moisture exchanger 100.

FIG. 2 is a graph showing the characteristics of the generation of ozone by the ozone-generating apparatus of FIG. 1.

In FIG. 2, the concentration of ozone in the dry ozone-containing air at the outlet of the ozonizer 4 is referred as $C_1$ and the concentration of ozone in the wet ozone-containing air discharged from the adsorbent tower 2 or 3 under the adsorbent-recovering operation is referred as $C_2$.

As it is clear from the graph, ozone in the dry ozone-containing air is decomposed on the surface of the moisture adsorbent during the adsorbent-recovering operation, the concentration of ozone $C_2$ is relatively lower than the concentration of ozone $C_1$, at the time after filling the adsorbent.

However, when silica gel is used as the adsorbent, in the normal state, the decomposition of ozone by the adsorbent in the recovery of the adsorbent by the dry ozone-containing air is inhibited by the acidic groups on the surface of silica gel whereby the concentration of ozone $C_1$ in the dry ozone-containing air is substantially the same with the concentration of ozone $C_2$ in the wet ozone-containing air.

However, when the adsorbent towers 2, 3 are switched, the dry ozone-containing air is fed into the silica gel which has dried the wet air, whereby a part of ozone (usually 0.001 to 0.003 wt.%) is adsorbed on the silica gel. Accordingly, the concentration of ozone $C_2$ in the wet ozone-containing air is suddenly decreased until reaching saturation of adsorbed ozone.

The time from the decrease of the concentration of ozone to the recovery to the normal condition is referred to as the ozone concentration-lowering period.

On the contrary, the concentration of ozone $C_1$ in the dry ozone-containing air increases because ozone adsorbed on the silica gel after the switching operation is desorbed to add the ozone to the dry air fed to the ozonizer 4 as the silica gel adsorbing ozone is used for drying air during the air drying operation.

The ozone concentration-lowering period in the switching is increased in proportion to the amount of the adsorbent.

The ozone-generating efficiency of the ozonizer 4 highly depends upon the degree of dryness of the dry air fed.

For example, when the dry air having a dew point of $-60°$ C is fed to the ozonizer 4 instead of the dew point of $-50°$ C, the ozone-generating efficiency increases about 10%.

Accordingly, in order to increase the ozone-generating efficiency by decreasing the dew point of the dry air in the case using the silica gel as the adsorbent, the amount of silica gel should be quite large, because the adsorption of moisture by the silica gel is quite low at the low moisture concentration. Accordingly, the ozone concentration-lowering period is prolonged and the use of the ozone-containing air is limited and the ozone concentration-controlling device is needed, disadvantageously.

Activated alumina and synthetic zeolite having a pore diameter of more than 4 A which have been used for decreasing the dew point of air cannot be used as the moisture adsorbent because they have the ozone-decomposing effect.

SUMMARY OF THE INVENTION

It is an object of the present invention to provide an ozone-generating apparatus which has not the above-mentioned disadvantages.

The object of the present invention has been attained by using the synthetic zeolite having a pore diameter of less than 4 Å as the moisture adsorbent filled in the moisture exchanger instead of all or part of the silica gel used in the conventional ozone generating apparatus.

The synthetic zeolite having a pore diameter of less than 4 Å does not adsorb large molecules such as ozone molecules and it adsorbs only small molecules whose diameters are smaller than the pore diameter of the moisture adsorbent such as water molecules. Accordingly, the decomposition of ozone is not caused, and the concentration of ozone in the ozone-containing air passed through the moisture exchanger is not decreased.

DETAILED DESCRIPTION OF THE PREFERRED EMBODIMENTS

The structure and the operation of the ozone-generating apparatus of the invention are substantially the same as the conventional ozone-generating apparatus, however synthetic zeolite having a pore diameter of less than 4 Å is filled in the moisture exchangers 3, 4 instead of the silica gel.

The synthetic zeolite having a pore diameter of less than 4 Å is considered to be difficult to adsorb ozone from the viewpoint of crystalline structures whereas the decomposition of ozone on the silica gel is inhibited by the acidic groups on the surface of the silica gel.

The synthetic zeolite has cavities in the three-dimensional net structure and materials are mainly adsorbed in the cavities.

Accordingly, when the pore diameter at the inlets of the cavities is selected to be less than 4 Å, large molecules such as ozone molecules are not substantially adsorbed and only small molecules such as water molecule are adsorbed and the ozone which is not adsorbed on the synthetic zeolite is not substantially decomposed.

Figure 4:
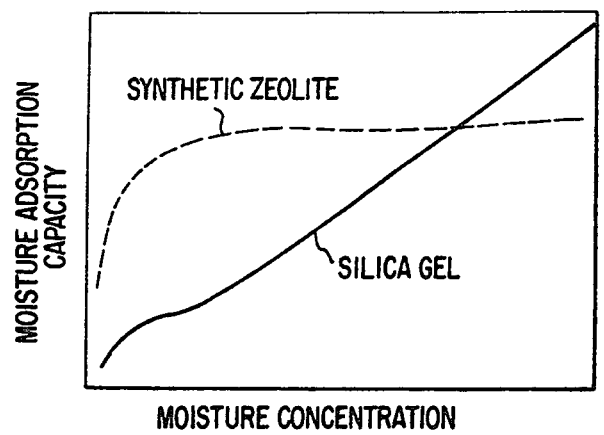
FIG. 4 is a graph showing characteristics of the synthetic zeolite and silica gel for adsorbing moisture.

FIG. 4 is a graph showing characteristics of the synthetic zeolite and the silica gel for adsorbing moisture.

As shown in FIG. 4, the moisture adsorption capacity of the synthetic zeolite in the low moisture concentration is remarkably larger than that of the silica gel. Accordingly, the dry air having low dew point can be obtained by using a small amount of the synthetic zeolite.

The ozone-generating apparatus of the invention is not limited to the above-mentioned ozonizer 4 and includes an oxygen recycling type ozone-generating apparatus which comprises the ozonizer 4 and an ozone-separating tower.

As stated above, in accordance with the invention, the synthetic zeolite having the pore diameter of less than 4 Å is used as the moisture adsorbent whereby the dew point of the ry air can be decreased by using a small amount of the moisture adsorbent, the ozone-generating efficiency is improved and the ozone concentration-lowering period can be shortened and the apparatus can have high efficiency and can be miniaturized in remarkable advantages.

Figure 5:
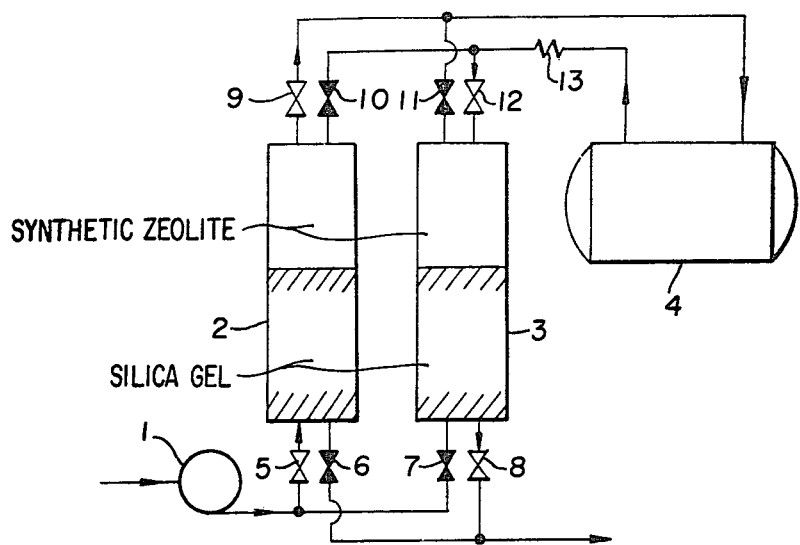
FIG. 5 is a block diagram showing the structure of the other embodiment of the ozone-generating apparatus of the invention.

FIG. 5 is a block diagram showing the structure of the first embodiment of the ozone-generating apparatus of the invention.

Figure 1:
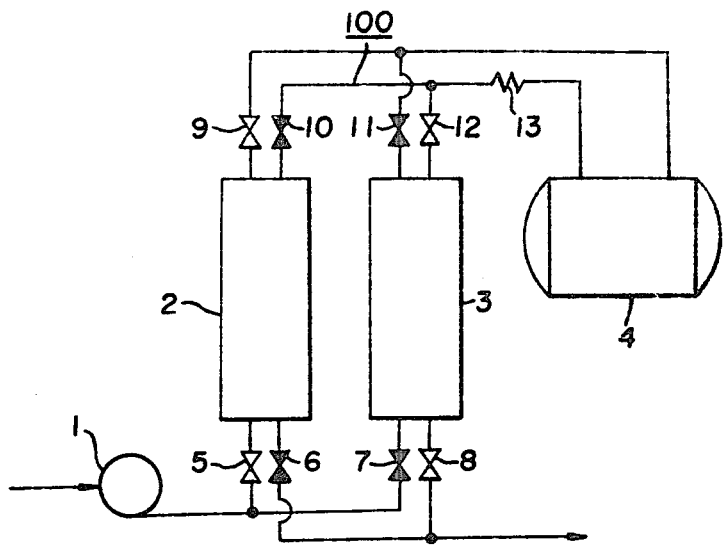
FIG. 1 is a block diagram showing the structure of the conventional ozone-generating apparatus.
Figure 2:
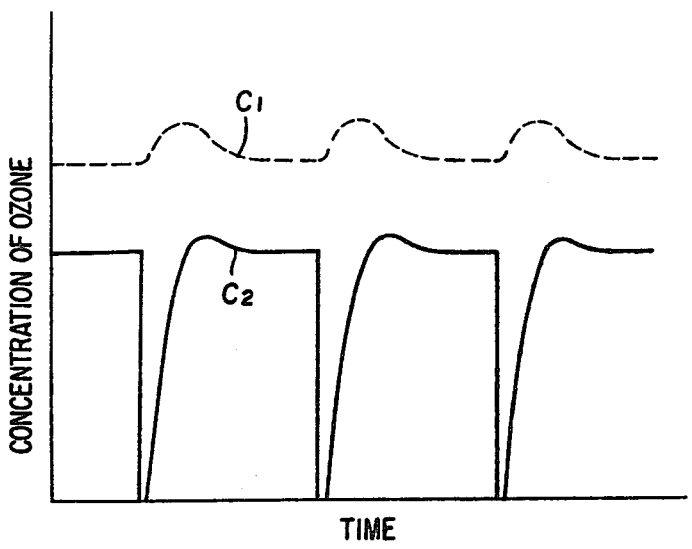
FIGS. 2 and 3 are respectively graphs showing characteristics for generating ozone by the conventional ozone-generating apparatus of FIG. 1.
Figure 3:
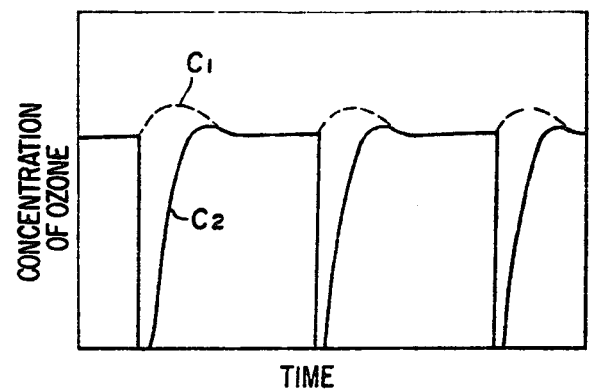

In FIG. 5, the blower 1, the ozonizer 4, the electromagnetic valves 5 to 12 and the flow resistance 13 are the same with those of the conventional apparatus of FIG. 1. Accordingly, the illustration thereof is not recited.

In each adsorbent tower 2, 3, silica gel is filled as the moisture adsorbent in the side of the blower 1 and the synthetic zeolite having the pore diameter of less than 4 A is filled in the side of the ozonizer 4.

The operation of the ozone-generating apparatus having the structure is the same with that of the conventional apparatus of FIG. 1 and accordingly, the illustration of the operation is not recited.

The synthetic zeolite having the pore diameter of less than 4 A as the moisture adsorbent is considered to be difficult to adsorb ozone from the viewpoint of crystalline structure and the decomposition of ozone is scarcely caused whereas the decomposition of ozone is inhibited by the acidic groups on the surface of the silica gel as stated above.

In the hydroscopic characteristics to moisture, the moisture adsorption capacity under low concentration of moisture is remarkably higher than that of the silica gel as shown in FIG. 4. Accordingly, the dry air having low dew point can be obtained by using a small amount of the moisture adsorbent.

On the other hand, the moisture adsorption capacity of the silica gel under high concentration of moisture is higher than that of the synthetic zeolite. Accordingly, higher moisture adsorption capacity can be given by the combination of the silica gel and the synthetic zeolite in comparison with the use of the same amount of the synthetic zeolite by itself. Moreover, the life of the adsorbent as the moisture adsorbent can be prolonged.

In first embodiment, two adsorbent towers 2, 3 are used alternatively performing the air drying operation and the moisture adsorbent-recovering operation. It is possible to use only one adsorbent tower 2 or 3 so as to alternatively repeat the air-drying operation and the moisture adsorbent-recovering operation by switching the passages by certain switching means.

Figure 6:
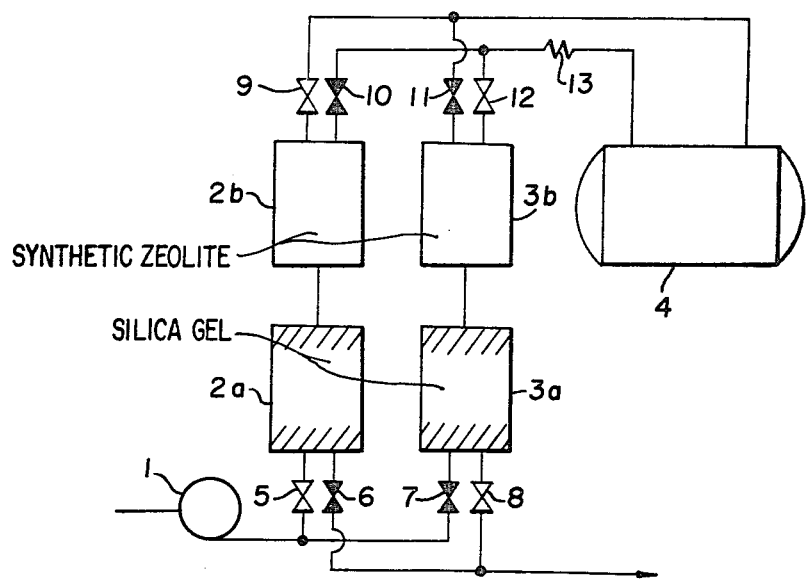
FIG. 6 is a block diagram showing the structure of the other embodiment of the ozone-generating apparatus of the invention.

In this embodiment, one cell type tower is used as the adsorbent tower 2 or 3. Thus, in the other embodiment of the invention as shown in FIG. 6, the adsorbent towers 2, 3 have two cell type structure as the separated cells 2a, 2b, 3a, and 3b, and the silica gel is filled in the separated cells 2a, 3a and the synthetic zeolite is filled in the separated cells 2b, 3b. This embodiment has the advantage that the operation for replacing the moisture adsorbent can be separately performed.

As stated above, in accordance with this embodiment of the invention, the silica gel and the synthetic zeolite are respectively filled as the moisture adsorbent in the adsorbent tower which has the function of the moisture exchanger of the ozone-generating apparatus, whereby the silica gel is used for the initial moisture adsorption and the synthetic zeolite is used for the final moisture adsorption. Accordingly, the ozone-generating efficiency is improved and the ozone concentration-lowering period at the switching operation, can be shortened to attain remarkable result in the practical operation.

The second embodiment will be illustrated.

In general, the ozone-decomposing rate on the surface of the adsorbent is in a range of about 10 to 20 wt.% in the case of the silica gel or the synthetic zeolite having the pore diameter of less than 4 Å and it is about 50 wt.% in the case of alumina and it is in a range of about 80 to 100 wt.% in the case of the synthetic zeolite having the pore diameter of more than 4 Å.

The decomposition of ozone by the adsorbent gradually decreases depending upon the operation of the ozonizer 4 to reach the constant.

The ozone-decomposing rate in the normal state is proportional to the amount of the moisture adsorbent. Under the specific condition, the rate of decomposition of ozone in the normal state of the moisture adsorbent is in a range of 0.1 to 0.5 wt.% in the case of a silica gel or the synthetic zeolite having the pore diameter of less than 4 A, and it is in a range of 15 to 70 wt.% in the case of the alumina or the synthetic zeolite having the pore diameter of more than 4 Å.

Thus, the ozone-decomposing rate in the normal state is remarkably low in the case of the silica gel or the synthetic zeolite having the pore diameter of less than 4 Å, however, it takes a long period to reach the normal state. During the period, the operation having low efficiency has been disadvantageously caused.

This embodiment overcomes these disadvantages of the conventional apparatus. The fact that the decomposition of ozone by the moisture adsorbent can be gradually inhibited by a small amount of nitrogen oxides produced by ozone in the nascent state, has been studied whereby the ozone-decomposing rate in the normal state has been attained within a short period in the operation after filling new adsorbent.

The structure and the operation of this embodiment which are the same with those of the conventional apparatus of FIG. 1 will not be recited.

In this embodiment, the moisture adsorbent such as the silica gel or the synthetic zeolite having the pore diameter of less than 4 Å which is filled in the adsorbent towers 2, 3, is treated with nitrogen oxides or a mixed gas of nitrogen oxides and ozone, whereby the sites for decomposing ozone on the surface of the moisture adsorbent are poisoned by nitrogen oxides to inhibit the decomposition of ozone and the minimum ozone-decomposing rate in the normal state can be attained within a short period.

In this embodiment of the ozone-generating apparatus, the loss of nitrogen oxides in the air-drying operation can be covered with the supply of nitrogen oxides produced in the ozonizer 4. Accordingly, it is unnecessary to feed nitrogen oxides during the operation.

Figure 7:
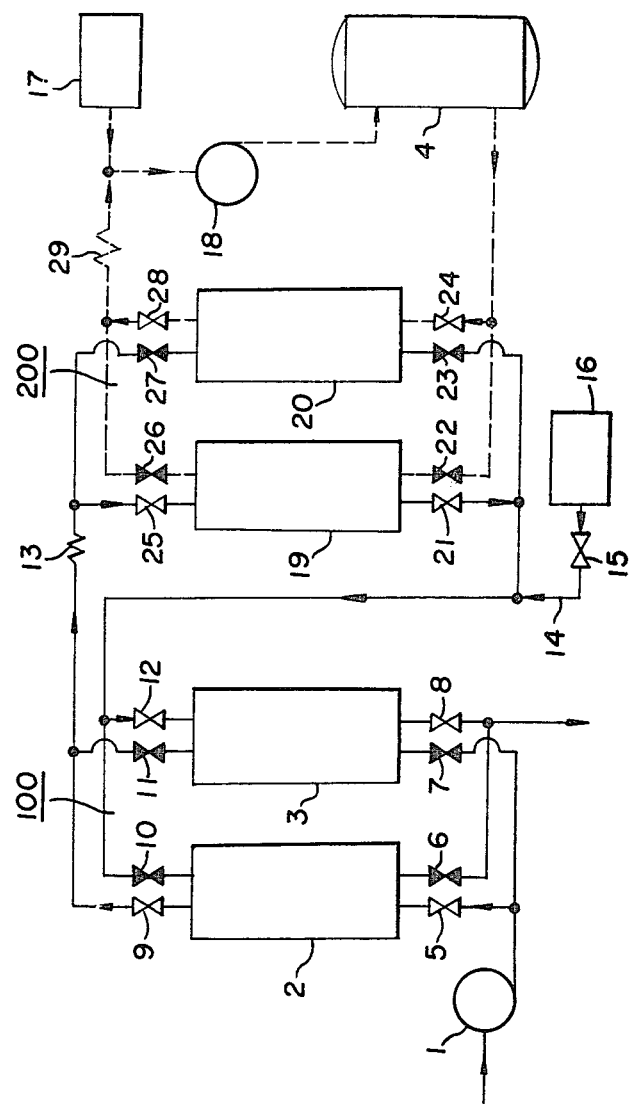
FIG. 7 is a block diagram showing the structure of the oxygen recycling type ozone-generating apparatus as the other embodiment of the invention.

FIG. 7 is a block diagram showing the structure of the third embodiment of the oxygen recycle type ozone-generating apparatus.

In FIG. 7, the blower 1 and the moisture exchanger 100 comprising the adsorbent towers 2, 3, the electromagnetic valves 5 to 12 and the flow resistance 13 and the ozonizer 4 are the same with those of the conventional apparatus of FIG. 1, and accordingly, the illustration thereof will not be recited. The reference 14 designates an inlet for feeding nitrogen oxides; 15 designates a feeding valve; 16 designates a nitrogen oxides storage container; 17 designates an oxygen-supplying device; 18 designates a blower for feeding under pressure oxygen supplied from the oxygen-supplying device 17; 19 and 20 respectively designate ozone-separating towers for separating ozone by adsorption, from the ozone-containing air generated by the ozonizer 4 and the silica gel is filled in the ozone separating tower as the moisture adsorbent; and 21 to 28 respectively designate electromagnetic valves and 29 designates a flow resistance.

The oxygen recycle type ozone-generating apparatus 200 is formed by the parts 1 to 29.

The operation of this embodiment of the oxygen recycle type ozone-generating apparatus will be illustrated referring to FIG. 7.

The operation as the moisture exchanger 100 is the same with that of the conventional apparatus of FIG. 1 and accordingly, the illustration of the operation is not be recited.

It will illustrate the case that the adsorbent tower 2 is in the air-drying operation; the adsorbent tower 3 is in the moisture adsorbent-recovering operation; the ozone-separating tower 19 is in the ozone-desorbing operation and the ozone-separating tower 20 is in the ozone-adsorbing operation.

Under the conditions that the electromagnetic valves 21, 24, 25, 28 are in the open state and the electromagnetic valves 22, 23, 26, 27 are in the closed state, oxygen supplied by the oxygen-supplying device 17 is compressed by the blower 18 to feed into the ozonizer 4. During the time passing through the ozonizer 4, a part of oxygen is converted into ozone by the silent discharge. The ozone-containing oxygen is fed through the electromagnetic valve 24 to the ozone-separating tower 20 wherein ozone is adsorbed and separated and only oxygen is recycled through the electromagnetic valve 28 to the blower 18.

An amount of oxygen decreased by the conversion to ozone is supplied by the oxygen-supplying device 17 and the above-mentioned operation is repeated.

On the other hand, in the moisture exchangers 100, the air-drying operation and the moisture adsorbent-recovering operation are alternatively repeated by the adsorbent towers 2, 3 whereby the dry air is continuously fed through the flow resistance 13 and the electromagnetic valve 25 into the ozone-separating tower 19. Ozone adsorbed in the ozone-separating tower 19 is desorbed to form the dry ozone-containing air and is recycled into the adsorbent tower 2 or 3 in the moisture adsorbent-recovering operation. In the next step, when ozone is adsorbed enough in the ozone-separating tower 20 or ozone in the ozone-separating tower 19 is desorbed enough, the electromagnetic valves 21, 24, 25, 28 are closed and the electromagnetic valves 22, 23, 26, 27 are opened whereby in the ozone-separating tower 19, the ozone-desorbing operation is changed to the ozone-adsorbing operation whereas in the ozone separating tower 20, the ozone-adsorbing operation is changed to the ozone-desorbing operation.

In the ozone-separating towers 19, 20, the operations are alternatively repeated to impart the function as the oxygen recycle type ozone-generating apparatus 200.

During the initial period for the operation of the moisture exchanger 100 or when ozone in the dry ozone-containing air discharged from the ozone-separating tower 19 or 20 begins to be decomposed in the adsorbent tower 2 or 3 under the moisture adsorbent-recovering operation, the feed valve 15 is opened to feed nitrogen oxides in the storage container 16 through the inlet 14 into the dry ozone-containing air.

The nitrogen oxides are adsorbed on the surface of the moisture adsorbent in the adsorbent tower 2, 3 to recover the function for inhibiting the decomposition of ozone and thus, the normal operation will be continued. In the case, the nitrogen oxides are not fed into the ozone-separating towers 19, 20.

When the supply of nitrogen oxides by the ozonizer 4 is impossible as the oxygen recycle type ozone-generating apparatus 200, the superior result can be attained by providing the means for supplying nitrogen oxides.

In the embodiments of the invention, two adsorbent towers are used. Thus, it is possible to apply the invention in the case that the air-drying operation and the moisture adsorbent-recovering operation are alternatively performed in one adsorbent tower by switching valves. The nitrogen oxides include NO, $NO_2$ and $N_2O_3$, etc. It is considered to be preferable to use $NO_2$ from the viewpoint of easy adsorption on the moisture adsorbent.

As stated above, in the embodiments, the decomposition of ozone by the moisture adsorbent can be inhibited and the minimum ozone-decomposing rate in the normal state can be attained within a short period, by adsorbing nitrogen oxides on the moisture adsorbent filled in the moisture exchanger of the ozone-generating apparatus. Accordingly, the practical advantages are remarkable.

What is claimed is:

1. An ozone-generating apparatus which comprises:
   an ozonizer;
   first and second moisture exchangers, connected to said ozonizer, each containing a synthetic zeolite having a pore diameter of less than 4 Angstroms which adsorbs nitrogen oxides, said exchangers alternately repeating an operation for drying air fed into the ozonizer and an operation for regenerating the moisture adsorbent by the dry ozone-containing air obtained by the ozonizer; and,
   means for feeding nitrogen oxides which is operably connected to said first and second moisture exchangers.

2. An ozone-generating apparatus according to claim 1, wherein nitrogen oxide is $NO_2$.

3. An ozone-generating apparatus according to claim 1, which further comprises:
   valve means operatively interconnecting said ozonizer and said first and second moisture exchangers.

4. An ozone-generating apparatus according to claim 1, which further comprises:
   means for storing said nitrogen oxides which is operatively connected to said means for feeding nitrogen oxides.

5. An ozone-generating apparatus according to claim 1, which further comprises:
   means for supplying oxygen to said ozonizer operatively connected to said ozonizer; and
   means for separating said oxygen from ozone generated by said ozonizer and recycling said oxygen to said ozonier.

6. An ozone-generating apparatus according to claim 5, wherein said means for separating and recycling said oxygen comprises first and second towers.

* * * * *